US012811744B2

(12) United States Patent
Korpi et al.

(10) Patent No.: US 12,811,744 B2
(45) Date of Patent: Nov. 24, 2026

(54) APPARATUS, METHODS AND COMPUTER PROGRAMS FOR TRANSMITTING DATA USING REDUCED DEMODULATION REFERENCE SIGNAL RESOURCES

(71) Applicant: Nokia Technologies Oy, Espoo (FI)

(72) Inventors: Dani Johannes Korpi, Espoo (FI); Mikko Johannes Honkala, Espoo (FI); Janne Matti Juhani Huttunen, Espoo (FI); Antti Anton Toskala, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 287 days.

(21) Appl. No.: 18/618,548

(22) Filed: Mar. 27, 2024

(65) Prior Publication Data

US 2024/0333457 A1 Oct. 3, 2024

(30) Foreign Application Priority Data

Mar. 30, 2023 (FI) ..................................... 20235367

(51) Int. Cl.
*H04W 4/00* (2018.01)
*H04L 5/00* (2006.01)

(52) U.S. Cl.
CPC .................................. *H04L 5/0051* (2013.01)

(58) Field of Classification Search
CPC .......................... H04L 5/0051; H04L 25/0226
See application file for complete search history.

(56) References Cited

U.S. PATENT DOCUMENTS 8,009,606 B2 * 8/2011 Seo ....................... H04L 5/0051 370/319
9,337,974 B2 5/2016 Miao et al.
9,544,117 B2 1/2017 Gomadam
(Continued)

FOREIGN PATENT DOCUMENTS

WO 2021/181002 A1 9/2021
WO 2022/061628 A1 3/2022
WO 2022/073752 A1 4/2022

OTHER PUBLICATIONS

Honkala et al., "DeepRx: Fully Convolutional Deep Learning Receiver", arXiv, May 4, 2020, pp. 1-30.
(Continued)

*Primary Examiner* — Abdelnabi O Musa
(74) *Attorney, Agent, or Firm* — Carter, DeLuca & Farrell LLP

(57) ABSTRACT

Examples of the disclosure relate to apparatus, methods and computer programs for transmitting data. In examples of the disclosure a User Equipment (UE) can receive a configuration for releasing demodulation reference signal (DMRS) resources for uplink transmission. The releasing of the DMRS resources is contingent upon a resource allocation for the uplink transmission satisfying one or more criteria. The UE can also receive a resource allocation for the uplink transmission. If the resource allocation satisfies the one or more criteria the UE can release at least some of the DMRS resources. The UE can then use at least some of the released DMRS resources as a data resource within the resource allocation and transmit data using at least some of the released DMRS resources.

1 Claim, 10 Drawing Sheets

(56) References Cited

U.S. PATENT DOCUMENTS

| | | | | |
|---|---|---|---|---|
| 2011/0218016 | A1* | 9/2011 | Hirakawa | H04B 7/024 455/524 |
| 2013/0265955 | A1* | 10/2013 | Kim | H04L 5/0051 370/329 |
| 2014/0314012 | A1* | 10/2014 | Tang | H04L 5/0057 370/329 |
| 2015/0282123 | A1* | 10/2015 | Miao | H04W 48/00 455/450 |
| 2016/0057753 | A1* | 2/2016 | Yang | H04L 5/0051 370/336 |
| 2016/0192385 | A1* | 6/2016 | Tooher | H04L 5/0051 370/336 |
| 2019/0253219 | A1* | 8/2019 | Fan | H04L 5/001 |
| 2020/0163078 | A1* | 5/2020 | Jiang | H04J 13/18 |
| 2021/0112535 | A1* | 4/2021 | Wang | H04W 16/32 |
| 2022/0015123 | A1* | 1/2022 | Taherzadeh Boroujeni | H04L 5/0051 |
| 2022/0191081 | A1* | 6/2022 | Kim | H04B 1/713 |
| 2022/0271886 | A1* | 8/2022 | He | H04L 5/0048 |
| 2022/0321389 | A1* | 10/2022 | Taherzadeh Boroujeni | H04L 25/0224 |
| 2023/0199221 | A1* | 6/2023 | Stoica | H04L 1/0041 375/240.27 |
| 2023/0216711 | A1* | 7/2023 | Yao | H04L 5/0051 370/328 |

OTHER PUBLICATIONS

Korpi et al., "DeepRx MIMO: Convolutional MIMO Detection with Learned Multiplicative Transformations", arXiv, Oct. 30, 2020, 6 pages.

Office action received for corresponding Finnish Patent Application No. 20235367, dated Aug. 28, 2023, 14 pages.

Extended European Search Report received for corresponding European Patent Application No. 24161992.3, dated Aug. 12, 2024, 8 pages.

* cited by examiner

APPARATUS, METHODS AND COMPUTER PROGRAMS FOR TRANSMITTING DATA USING REDUCED DEMODULATION REFERENCE SIGNAL RESOURCES

TECHNOLOGICAL FIELD

Examples of the disclosure relate to apparatus, methods and computer programs for transmitting data. Some relate to apparatus, methods and computer programs for transmitting data using Physical Uplink Shared Channel (PUSCH).

BACKGROUND

In 5G New Radio (NR), PUSCH is the physical uplink channel that carries user data. Demodulation Reference Signal (DMRS) is a reference signal associated with PUSCH. DMRS is used for channel estimation as part of coherent demodulation of PUSCH.

BRIEF SUMMARY

According to various, but not necessarily all, examples of the disclosure there is provided a User Equipment comprising:

- means for receiving a configuration for releasing demodulation reference signal resources for uplink transmission, wherein the releasing of the demodulation reference signal resources is contingent upon a resource allocation for the uplink transmission satisfying one or more criteria;
- means for receiving a resource allocation for the uplink transmission;
- means for releasing at least some of the demodulation reference signal resources if the resource allocation satisfies the one or more criteria and using at least some of the released demodulation reference signal resources as a data resource within the resource allocation; and
- means for transmitting data using at least some of the released demodulation reference signal resources.

The User Equipment may comprise means for enabling the User Equipment to perform at least one of:

- informing a network entity that the User Equipment supports releasing demodulation reference signal resources for the uplink transmission;
- requesting releasing of demodulation reference signal resources for the uplink transmission.

The received configuration may comprise an indication of a proportion of demodulation reference signal resources that can be released.

The indication may comprise one or more parameters representing a relationship between allocated resources and a proportion of demodulation reference signal resources that can be released.

The indication may comprise information indicating one or more input values for a function and the user equipment comprises means for using the input values and the function to determine the proportion of demodulation reference signal resources that can be released.

The user equipment may comprise means for accessing a look up table to determine at least one of:

- a reduction level for the demodulation reference signal;
- time and frequency positions of the demodulation reference signal.

The proportion of demodulation reference signal resources that can be released may be determined based, at least in part, on one or more service requirements.

The received configuration may comprise information indicating a validity timer for the releasing of the demodulation reference signal resources.

The configuration may be received in a control channel.

The control channel may comprise a Physical Downlink Control Channel.

According to various, but not necessarily all, examples of the disclosure there is provided a method comprising:

- receiving a configuration for releasing demodulation reference signal resources for uplink transmission, wherein the releasing of the demodulation reference signal resources is contingent upon a resource allocation for the uplink transmission satisfying one or more criteria;
- receiving a resource allocation for the uplink transmission;
- releasing at least some of the demodulation reference signal resources if the resource allocation satisfies the one or more criteria and using at least some of the released demodulation reference signal resources as a data resource within the resource allocation; and
- transmitting data using at least some of the released demodulation reference signal resources.

According to various, but not necessarily all, examples of the disclosure there is provided a computer program comprising instructions which, when executed by a user equipment, cause the user equipment to perform at least:

- receiving a configuration for releasing demodulation reference signal resources for uplink transmission, wherein the releasing of the demodulation reference signal resources is contingent upon a resource allocation for the uplink transmission satisfying one or more criteria;
- receiving a resource allocation for the uplink transmission;
- releasing at least some of the demodulation reference signal resources if the resource allocation satisfies the one or more criteria and using at least some of the released demodulation reference signal resources as a data resource within the resource allocation; and
- transmitting data using at least some of the released demodulation reference signal resources.

According to various, but not necessarily all, examples of the disclosure there is provided a network entity comprising:

- means for transmitting a configuration for releasing demodulation reference signal resources for uplink transmission by a User Equipment, wherein the releasing of the demodulation reference signal resources is contingent upon a resource allocation for the uplink transmission satisfying one or more criteria;
- means for transmitting a resource allocation for the uplink transmission; and
- means for receiving data wherein the received data uses at least some of the released demodulation reference signal resources.

The network entity may comprise means for transmitting the configuration in response to determining that the network entity is capable of using a demodulation reference signal with reduced resources.

The network entity may comprise means for receiving at least one of:

- an indication that the User Equipment supports releasing demodulation reference signal resources for the uplink transmission;
- a request from the User Equipment to release demodulation reference signal resources for the uplink transmission.

The configuration may comprise an indication of a proportion of demodulation reference signal resources that can be released.

The configuration may comprise information indicating a validity timer for the releasing of the demodulation reference signal resources.

The configuration may be transmitted in a control channel.

According to various, but not necessarily all, examples of the disclosure there is provided a method comprising:

transmitting a configuration for releasing demodulation reference signal resources for uplink transmission by a User Equipment, wherein the releasing of the demodulation reference signal resources is contingent upon a resource allocation for the uplink transmission satisfying one or more criteria;

transmitting a resource allocation for the uplink transmission; and receiving data wherein the received data uses at least some of the released demodulation reference signal resources.

According to various, but not necessarily all, examples of the disclosure there is provided a computer program comprising instructions which, when executed by a User Equipment, cause the User Equipment to perform at least:

transmitting a configuration for releasing demodulation reference signal resources for uplink transmission by a User Equipment, wherein the releasing of the demodulation reference signal resources is contingent upon a resource allocation for the uplink transmission satisfying one or more criteria;

transmitting a resource allocation for the uplink transmission; and receiving data wherein the received data uses at least some of the released demodulation reference signal resources.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which:

Dictation D replaces:

Figure 1:
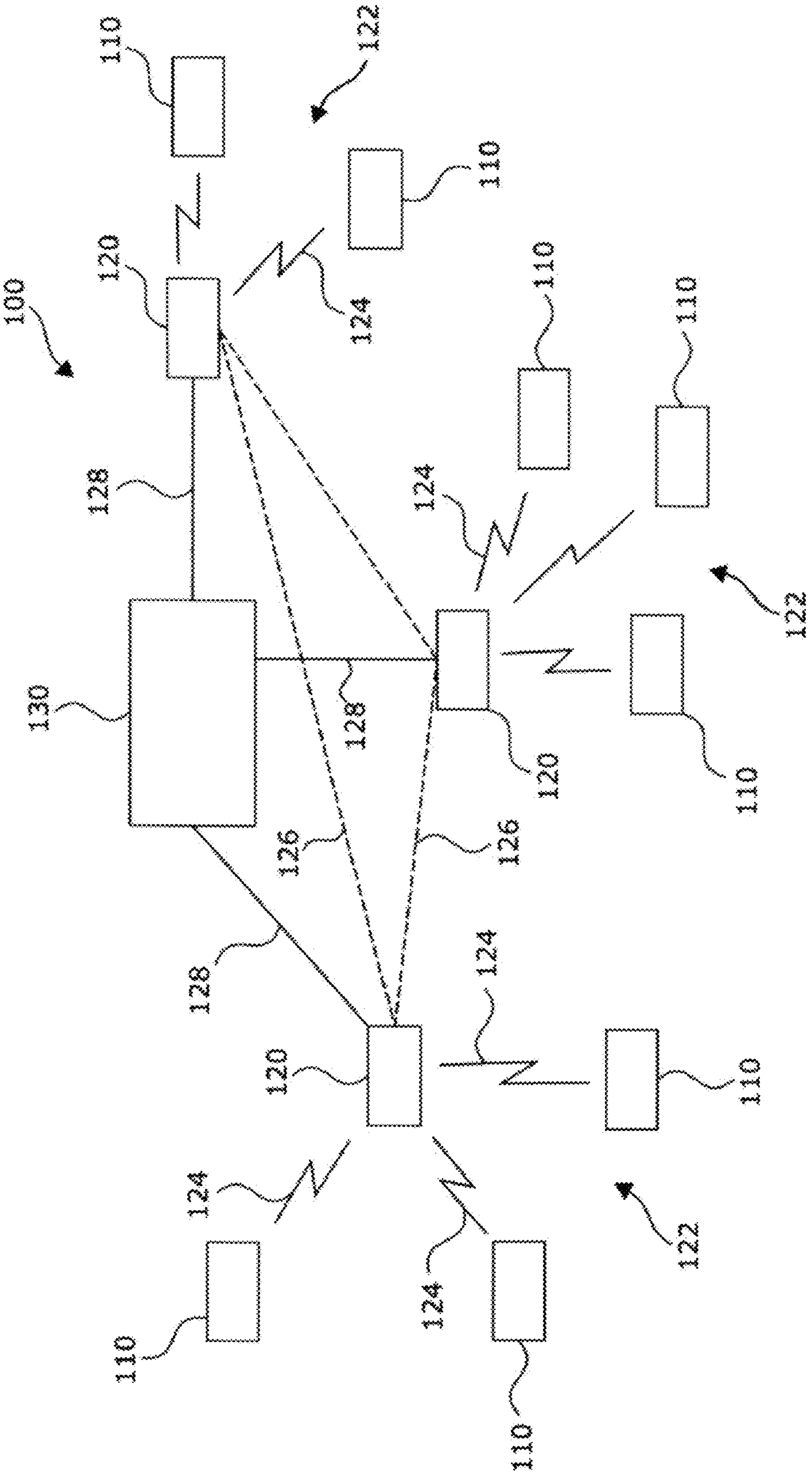
FIG. 1 shows an example network.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Corresponding reference numerals are used in the figures to designate corresponding features. For clarity, all reference numerals are not necessarily displayed in all figures.

Definitions

AR Augmented Reality
BER Bit Error Rate
BWP Bandwidth Part
CE Control Element
DCI Downlink Control Information
DFT-s Discrete Fourier Transform Spread
DMRS Demodulation Reference Signal
E-UTRA Evolved Universal Mobile Telecommunications System (UMTS) Terrestrial Radio Access
gNB NR base station
IoT Internet of Things
LUT Look-Up Table
MAC Medium Access Control
NR New Radio
OFDM Orthogonal Frequency-Division Multiplexing
O-RAN O-RAN
PDCCH Physical Downlink Control Channel
PRB Physical Resource Block
PUCCH Physical Uplink Control Channel
PUSCH Physical Uplink Shared Channel
RAN Radio Access Network
RB Resource Block
RE Resource Element
SCell Secondary Cell
SIM Subscriber Identity Module
UE User Equipment
UL Uplink
VR Virtual Reality
XR Extended Reality

DETAILED DESCRIPTION

FIG. 1 illustrates an example of a network 100 such as a 5G NR network. The network 100 comprises a plurality of terminal apparatus 110 and a plurality of network entities 120, 130. The network entities 120, 130 can comprise one or more node apparatus 120 that can be configured to communicate with the terminal apparatus 110. The network entities can also comprise one or more core network apparatus 130. The one or more core network apparatus 130 communicate with the node apparatus 120. In some examples the one or more core network apparatus 130 communicate with the terminal apparatus 110.

The one or more core network apparatus 130 can, in some examples, communicate with each other. The one or more node apparatus 120 can, in some examples, communicate with each other.

The network 100 can be a cellular network comprising a plurality of cells 122 each served by a node apparatus 120. In this example, the interface between the terminal apparatus 110 and a node apparatus 120 defining a cell 122 is a wireless interface 124.

The node apparatus 120 comprises one or more cellular radio transceivers. The terminal apparatus 110 comprises one or more cellular radio transceivers.

In the example illustrated the cellular network 100 is a third generation Partnership Project (3GPP) network in which the terminal apparatus 110 are user equipment (UE) and the node apparatus 120 can be access nodes such as base stations.

The term 'user equipment' is used to designate mobile equipment comprising a smart card for authentication/encryption etc. such as a Subscriber Identity Module (SIM). In some examples the term 'user equipment' is used to designate mobile equipment comprising circuitry embedded as part of the user equipment for authentication/encryption such as software SIM.

The node apparatus 120 can be any suitable base station. A base station is an access node. It can be a network entity responsible for radio transmission and reception in one or more cells to or from the UE 110. The node apparatus 120 can be a network element in a Radio Access Network (RAN), an Open-Radio Access Network (O-RAN), a E-UTRA (Evolved Universal Mobile Telecommunications System (UMTS) Terrestrial Radio Access) network, or any other suitable type of network.

The core network apparatus 130 can be part of a core network. The core network apparatus 130 can be configured to manage functions relating to connectivity for the UEs 110. For example, the core network apparatus 130 can be configured to manage functions such as connectivity, mobility, authentication, authorization and/or other suitable functions.

In the example of FIG. 1 the core network apparatus 130 is shown as a single entity. In some examples the core network apparatus 130 could be distributed across a plurality of entities. For example, the core network apparatus 130 could be cloud based or distributed in any other suitable manner.

The network 100 can be a 4G or 5G network, for example. It can for example be a New Radio (NR) network that uses gNB or eNB as access nodes 120. New Radio is the 3GPP name for 5G technology. In such cases the node apparatus 120 can comprise gNodeBs (gNBs) 120 configured to provide user plane and control plane protocol terminations towards the UE 110 and/or to perform any other suitable functions. The gNBs 120 are interconnected with each other by means of an X2/Xn interface 126. The gNBs are also connected by means of the N2 interface 128 to the core network apparatus 130. Other types of networks and interfaces could be used in other examples. Other types of networks could comprise next generation mobile and communication network, for example, a 6G network.

Figure 2:
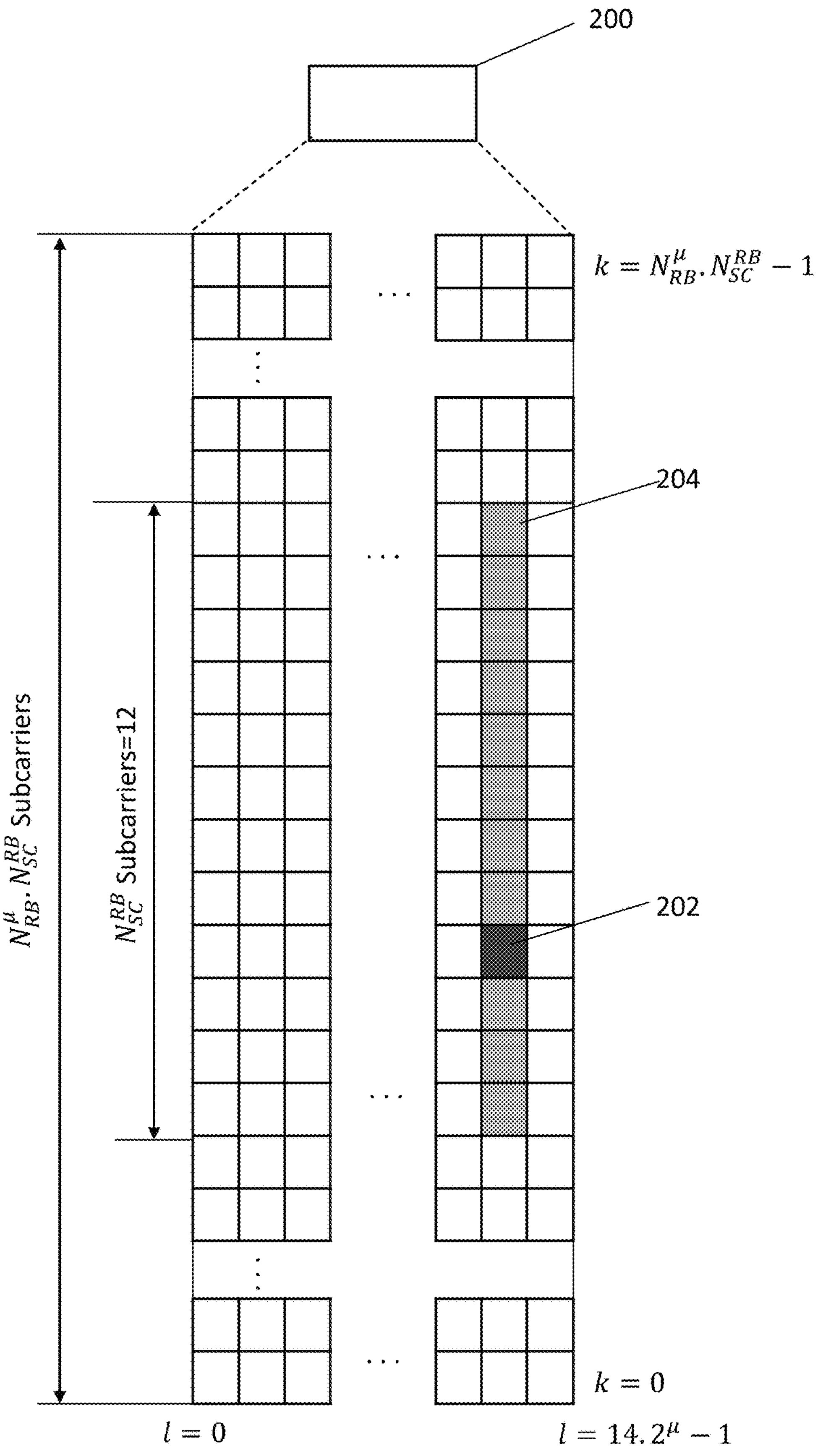
FIG. 2 shows an example Physical Resource Block.

FIG. 2 conceptually shows a Physical Resource Block (PRB) that can be used for transmitting data in networks such as the network of FIG. 1.

FIG. 2 shows resource elements (RE) in a single subframe 200. FIG. 2 shows a resource grid with Orthogonal Frequency-Division Multiplexing (OFDM) symbols in the time axis and subcarriers in the frequency axis.

The grid shows the resource elements (RE) 202. An example RE 202 is shaded dark grey in FIG. 2. An RE 202 comprises one sub-carrier during one OFDM symbol. An RE 202 can be uniquely identified by (k, l) where k is the index in the frequency domain and/refers to the OFDM position in the time domain relative to some reference point.

A Resource Block (RB) 204 comprises twelve consecutive REs 202. An example RB is shaded light grey in FIG. 2.

A PRB is the resource blocks that are used for actual transmission or reception. A gNB 120 can allocate PRBs to a UE 110. A set of PRBs forms a Bandwidth part (BWP). The bandwidth available to the UE 11 for transmitting data is determined by the number of PRBs that are allocated to the UE 110.

In networks 100 such as the network 100 of FIG. 1 PUSCH is the physical uplink channel that carries user data. Demodulation Reference signal (DMRS) is a reference signal associated with PUSCH. DMRS is used for channel estimation as part of coherent demodulation of PUSCH.

The resources allocated for PUSCH are within the BWP of the carrier. The resources in time domain for PUSCH transmission are scheduled by downlink control information (DCI) in the field Time domain resource assignment. The resources in the frequency domain for PUSCH transmission are scheduled by a DCI in the field Frequency domain resource assignment. This field indicates whether the resource allocation of resource blocks (RBs) is contiguous or non-contiguous, based on the allocation type. The RBs allocated are within the BWP.

Figure 3:
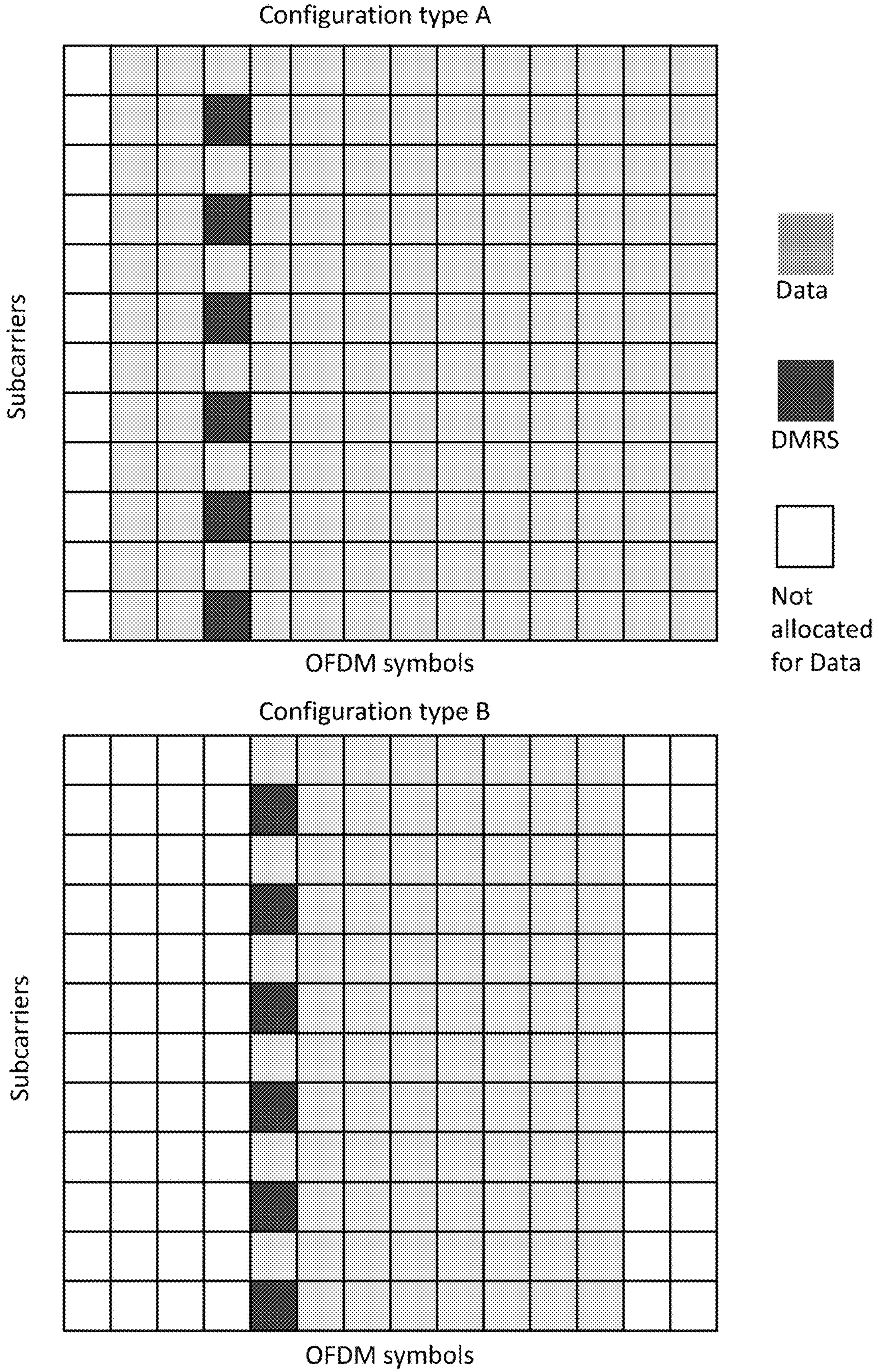
FIG. 3 shows example DMRS mappings.

DMRS can be mapped to PUSCH in two different ways and they are referred to as mapping type A and mapping type B. In type A the first DMRS is located in the second or third OFDM symbol whereas in type B the first DMRS is located in the first symbol of the data allocation. The mapping types are illustrated in FIG. 3.

Examples of the disclosure can also be implemented using other types of waveforms such as Discrete Fourier Transform Spread (DFT-s)-OFDM or any other suitable type of waveform.

In examples of the disclosure the proportion of REs that can be used for Uplink (UL) transmission by a UE 110 can be increased by releasing resources that have been allocated to DMRS. This can increase the data throughput which can be beneficial for use-cases which require high data throughput such as Augmented Reality (AR), virtual reality (VR) and extended reality (XR). DMRS resources can be released if the UE 110 and a network entity such as the gNB 120 have capabilities to use a reduced DMRS mode. For instance, if the gNB 120 has machine learning capabilities this can enable the gNB 120 to perform the channel estimation with a sparser DMRS and so can provide capabilities for reduced DMRS.

Figure 4A:
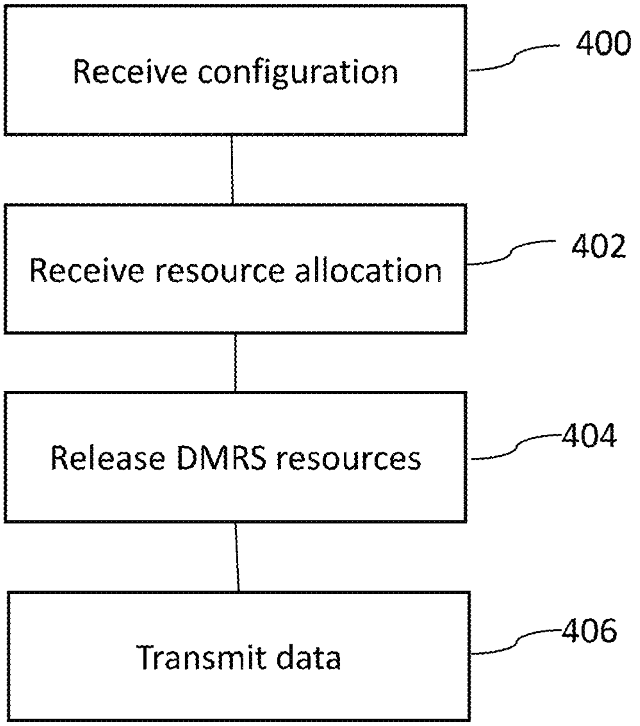
FIGS. 4A and 4B show example methods.
Figure 4B:
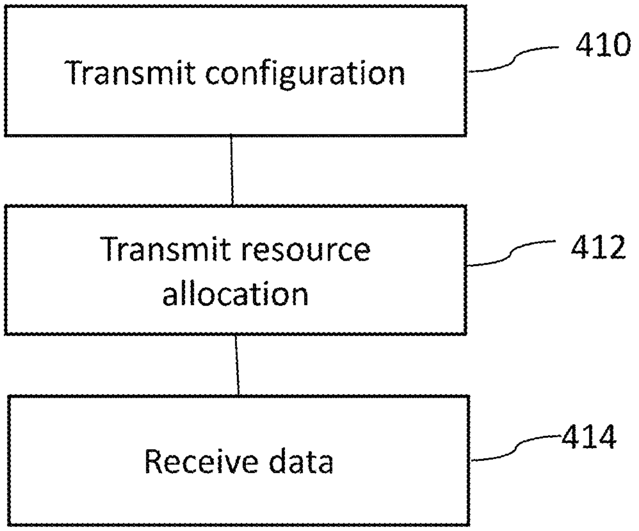

FIGS. 4A and 4B show methods according to examples of the disclosure. The methods enable a reduced DMRS mode to be implemented.

The example method of FIG. 4A could be implemented by a UE 110 or any other suitable terminal apparatus or device.

The method comprises, at block 400, receiving a configuration for releasing DMRS resources for UL transmission. The releasing of the DMRS resources is contingent upon a resource allocation for the UL transmission satisfying one or more criteria. That is, if the criteria for the resource allocation are determined to be satisfied, then the DMRS resources can be released in accordance with the received configuration. If the criteria for the resource allocation are not determined to be satisfied, then the DMRS resources are not released.

The configuration can be received from a network entity such as a gNB 120 that the UE 110 is in communication with.

In some examples the UE 110 can be configured to inform a network entity, such as the gNB 120, that the UE 110 supports releasing DMRS resources for the UL transmission. In some examples the UE 110 can be configured to requesting releasing of DMRS resources for the UL transmission. The configuration can be received in response to the information or request from the UE 110.

The configuration can be received via any suitable means. In some examples the configuration can be received in a control channel. The control channel can comprise a Physical Downlink Control Channel (PDCCH) or any other suitable channel.

In some examples the configuration could be received in DCI signaling. For instance, an indication that a reduced DMRS mode can be activated could be added to the UL unicast signaling scheduling format, or a new DCI format could be defined. In some examples an activation time for the reduced DMRS mode could be defined. This can enable the gNB 120 to determine that the configuration has been received because an ACK message indicating successful reception can be transmitted.

In some examples the configuration can be received using Medium Access Control (MAC) Control Elements (CE) which carry parameters like Timing Advance commands or Secondary Cell (SCell) activation/deactivation.

At block 402 the method comprises receiving a resource allocation for the UL transmission.

The resource allocation can be received from a network entity such as a gNB 120 that the UE 110 is in communication with.

The resource allocation can comprise an indication of the number of PRBs or any other suitable information.

At block 404 the method comprises releasing at least some of the DMRS resources if the resource allocation satisfies the one or more criteria. At least some of the released DMRS resources are then used as a data resource within the resource allocation.

At block 406 the method comprises transmitting data using at least some of the released DMRS resources. The data can be transmitted using PUSCH. The use of the released DMRS resources increases the data resources and can thereby improve data throughput.

If the resource allocation does not satisfy the one or more criteria then the DMRS resources would not be released and the data would be transmitted with a DMRS of normal density. In this case the additional resources would not be available for the data transmission.

The UE 110 can continue to transmit data using at least some of the released DMRS resources until a trigger event is detected. After the trigger event the UE 110 can revert to transmitting data with a DMRS of normal density. The trigger event could be the expiry of a timer, a signal from the gNB 120 or any other suitable event. In some examples the timer could be a validity timer that has been indicated in the configuration. The validity timer could define a number of transmissions for which the released DMRS resources can be used for data transmission.

The releasing of the DMRS resources provides different DMRS modes. For instance, a UE 110 can use a reduced DMRS mode in which DMRS resources are released and used for data or a UE 110 can use a normal DMRS mode in which none of the DMRS resources are released.

In some cases, there might only be two different DMRS modes. That is there could be a reduced DMRS mode and a normal DMRS mode. In other cases there could be multiple different reduced DMRS modes where the different DMRS mode enable different proportions of DMRS resources to be released. In the different reduced DMRS modes different DMRS densities are used. For instance, a higher proportion of DMRS resources could be released in a high reduced DMRS mode and a lower proportion of DMRS resources could be released in a low reduced DMRS mode.

Where there are multiple reduced DMRS modes available, the DMRS mode that is to be used can be selected based, at least in part, on the resources allocated to the UE 110 for the UL transmission.

If there is only one DMRS mode that can be used then the proportion of the DMRS resources that are to be released are fixed and the gNB 120 does not need to also inform the UE 110 of the DMRS mode that is to be used or of a proportion of DMRS resources that can be released. However, if there are multiple reduced DMRS modes available and the different modes allow for different densities of DMRS resources then the gNB 120 can indicate to the UE 110 which DMRS mode is to be used or the proportion of DMRS resources that can be released.

In some examples the configuration can comprise an indication of a proportion of DMRS resources that can be released. In some examples this indication could comprise a value that indicates the proportion of DMRS resources that can be released. In some cases, the indication comprises information that enables the UE 110 to calculate or look up the proportion of DMRS resources that can be released. For instance, in some cases the indication can comprises one or more parameters representing a relationship between allocated resources and a proportion of DMRS resources that can be released.

In some cases, the indication can comprise information indicating one or more input values for a function. The UE 110 can be configured to use the input values and the function to determine the proportion of DMRS resources that can be released. The function can be a function that is pre-agreed so that the UE 110 can access the function before the configuration is received. In some cases the function can be a function that is signaled to the UE 110. This could be signaled with the configuration or could be signaled separately. The input values could be values that relate to the number of PRBs allocated to the UE 110 or channel dynamicity or any other factors, or combination of factors, that affect the reliability of the channel.

In some examples the UE 110 can be configured to access a look up table to determine a reduction level for the DMRS and/or time and frequency positions of the DMRS. The reduction level for the DMRS and/or time and frequency positions of the DMRS can be determined based on the number of PRBs allocated to the UE 110. The UE 110 can therefore use a parameter such as the allocated number of PRBs to find the appropriate values for the reduction level for the DMRS and/or time and frequency positions of the DMRS in a look-up table.

In some examples the proportion of DMRS resources that can be released can be determined based, at least in part, on one or more service requirements. For instance, if the UE 110 is using a service that requires a high data throughput then a larger proportion of the DMRS resources can be released.

FIG. 4B shows a method corresponding to the method of FIG. 4A. The example method of FIG. 4B could be implemented by a gNB 120 or any other suitable network entity.

At block 410 the method comprises transmitting a configuration for releasing DMRS resources for UL transmission by a UE 110. The releasing of the DMRS resources is contingent upon a resource allocation for the UL transmission satisfying one or more criteria.

The configuration can be transmitted to the UE 110.

The configuration can be transmitted via any suitable means. In some examples the configuration can be transmitted in a control channel. The control channel can comprise a Physical Downlink Control Channel (PDCCH) or any other suitable channel.

In some examples the configuration could be transmitted in DCI signaling. For instance, an indication that a reduced DMRS mode can be activated could be added to the UL unicast signaling scheduling format, or a new DCI format could be defined. In some examples an activation time for the reduced DMRS mode could be defined. This can enable the gNB 120 to determine that the configuration has been received because an ACK message indicating successful reception can be transmitted.

In some examples the configuration can be transmitted using Medium Access Control (MAC) Control Elements (CE) which carry parameters like Timing Advance commands or Secondary Cell (SCell) activation/deactivation.

In some examples the configuration can be transmitted in response to any suitable trigger event. In some examples the configuration could be transmitted in response to a request or information from a UE 110.

In some examples the configuration can be transmitted if it is determined that the gNB 120, or other network entity, is capable of using a reduced DMRS mode. For instance, a receiver of a gNB 120 could have machine learning capability for physical layer processing. This can enable the receiver to achieve high performance with a sparser DMRS pattern than would be used for receiver that does not have the machine learning capability. Therefore, if it is determined that the gNB 120 has machine learning capability and that the machine learning program is adequately trained it can be determined that the gNB is capable of using DMRS with reduced resources.

The machine learning programs can be trained to harness the channel correlation between adjacent REs for more efficient detection. The correlation between adjacent REs is due to the wireless channel having a certain coherence length which means that wireless channels nearby in time and frequency are correlated. Therefore, there is a relationship between the detection accuracy and bandwidth or number of allocated PRBs. Therefore, within a certain bandwidth range, the performance of the machine learning algorithms will increase with respect to the allocated PRBs for the transmission. This enables a sparser DMRS to be used when more PRBs are used.

Therefore, the releasing of the DMRS resources is contingent upon the resource allocation.

The gNB 120 can indicate that it has support for releasing DMRS resources as part of normal broadcast information or as part of random access response, or in any other suitable manner.

At block 412 the method comprises transmitting a resource allocation for the UL transmission. The resource allocation can be transmitted to the UE 110. The resource allocation can comprise an indication of the number of PRBs or any other suitable information.

At block 414 the method comprises receiving data wherein the received data uses at least some of the released DMRS resources. That is, in the UL data that is received some of the DMRS resources have been replaced by data. The gNB 120 is aware of which DMRS symbols have been released because the gNB 120 controls the activation of the reduced DMRS mode and the releasing of the DMRS resources.

In examples of the disclosure the availability of a reduced DMRS mode can be determined for individual UEs 110. This enables a gNB 120 can to use a reduced DMRS mode for some UEs 110 but not for others.

Examples of the disclosure can be used in all grant types (configured grant type 2, for example Semi-persistent scheduling). Examples of the disclosure could also be used for grant free scheduling. If the examples of the disclosure are used for grant free scheduling where there are multiple UEs 110 that can use the same set of resources then all of the UEs 110 should use the reduced DMRS mode as indicted by the gNB 120. In this case the reduced DMRS mode could be activated for a group of UEs 110 rather than for individual UEs 110. The group-based mode could be useful of internet of things (IoT) applications, for use in private small area networks, or for other use case scenarios.

Examples of the disclosure could also be used where UL multi-Transmission Reception Points (TRP) are used. This can enable the UE 110 to communicate with multiple gNBs 120. In this case there can be signalling on the Xn-interface between the respective gNBs 120 so that all of the gNBs 120 have the relevant information relating to the releasing of the DMRS resources.

Where multiple reduced DMRS modes are available the UE 110 needs to determine the appropriate proportion of DMRS resources to release. There are different ways in which this information can be obtained by the UE 110. In the following description examples for reducing the DMRS density in the frequency domain are described. Similar examples can also be used to reduce the DMRS density in the time domain and the examples of the disclosure are not intended to be limited to a density reduction in the frequency domain.

In some examples there can be a fixed relationship between the resources allocated to the UE 110 and the proportion of DMRS resources that can be released. For instance, there can be a fixed relationship between the number of allocated PRBs and the DMRS density that can be used. This fixed relationship could be stored in a memory of the UE 110 or in any suitable location that can be accessed by the UE 110. The fixed relationship could be stored in a look-up table (LUT) or in any other suitable format.

A simplified example of a Look-up table is shown in table 1. This shows the relationship for up to sixteen PRBs. This is merely an example of how an LUT could indicate the respective relationships between the allocated number of PRBs and the proportion of DMRS that can be released. The actual values in the table are for illustrative purposes only.

TABLE 1

| Number of allocated PRBs for UE | Proportion of released DMRS |
|---|---|
| 1 | 0% |
| 2 | 20% |
| 4 | 40% |
| 8 | 60% |
| 16 | 80% |

The DMRS that are to be released can depend on the type of DMRS used. In some cases, every nth DMRS symbol (in time and/or frequency) is retained and all the others can be released, where n depends on the proportion of omitted DMRS as defined in the fixed relationship. In another case, the selection of released DMRS symbols can be done based on a predefined mapping function, which takes as its input the proportion of omitted DMRS symbols as well as the time and frequency positions of the original DMRS symbols. It can then output the indices of either the retained or released DMRS symbols. The mapping function can determine the indices of the retained or released DMRS symbols based on a pseudorandom generator operating on a fixed and known seed, making it deterministic.

In some examples the proportion of DMRS resources that can be released can be determined based on a function. In some examples the function can be predefined. In such cases the function can be stored in the memory of the UE 110 or in another location that is accessible to the UE 110. This could be similar to the storing of the LUT.

In some examples the function can be dependent upon one or more parameters so that different proportions of DMRS resources can be released based on the capabilities of the gNB 120, or any other suitable factors. In such cases the gNB 120 can indicate the parameters that are to be used to the UE 110. These could be signalled in the DCI field when the gNB 120 activates the releasing of DMRS resources, or it could be signalled in any other suitable way.

The function can have the number of scheduled PRBs (or other value relating to the resources allocated to the UE 110) as an input. The function could also have other parameters as inputs where the other parameters impact on the proportion of DMRs resources that can be released.

An example form for the function is:

$$f(N_{PRB}) = \min(0.8,\ 0.05(N_{PRB} - 1))$$

Where $N_{PRB}$ is the number of PRBS allocated to the UE 110.

With this function, the proportion of DMRS resources that can be released will increase from 0 to 0.8 when the number of allocated PRBs increases from 1 to 17.

Another potential input parameter for the function is the dynamicity of the channel. This can be quantified with the channel coherence time/frequency. In this case, the gNB 120 will estimate the channel dynamicity and quantify it with a parameter c and signal this to the UE 110 in the DCI field or in any other suitable signal. This parameter c can be an indicator of the channel coherence in time and/or frequency and has a value on the closed interval of (0,1). In such cases an example form for the function is:

$$f(N_{PRB}, c) = \min(0.8 + (0.25c - 0.125),\ 0.1c(N_{PRB} - 1))$$

A typical channel environment could have c=0.5. In this case the function would provide similar outputs to the channel-agnostic function described above.

If the channel coherence interval reduces the value of c will reduce. The function will then limit the amount of DMRS resources that can be released. For instance, in a very dynamic channel a value of c=0.1 could be used. In this case the function would give a maximum proportion of DMRS resources that cab be released as 0.16 with 16 PRBs.

The functions described here are for illustrative purposes. These functions demonstrate that increasing the number of PRBs should enable more DMRS resources to be released.

In some examples the gNB 120 could signal to the UE 110 the proportion of the DMRS resources that can be released. In such cases the gNB 120 will determine the proportion of DMRS resources that are to be released based on its own capabilities and the number of allocated PRBs and/or any other suitable factor. The gNB 120 can then signal the proportion of DMRS resources that are to be released in an additional DCI field when informing UE of the PUSCH scheduling grant, or using MAC CE or using any other suitable signalling. As an example, if only coarse granularity of the DMRS modes is needed, the width of this additional field can be three bits. The three bits can correspond to eight different reduced DMRS modes where the different reduced DMRS modes allow for releasing different proportions of the DMRS resources. The different reduced DMRS modes can correspond reductions in the DMRS density of 0.1 to 0.8 with uniform spacing. Once the UE 110 has received the information of the proportion of DMRS resources that are to be released the UE 110 can then use this for the UL transmission without having to use a LUT or a function. The determination of the released DMRS symbols can be determined in the same manner as described earlier.

Figure 5:
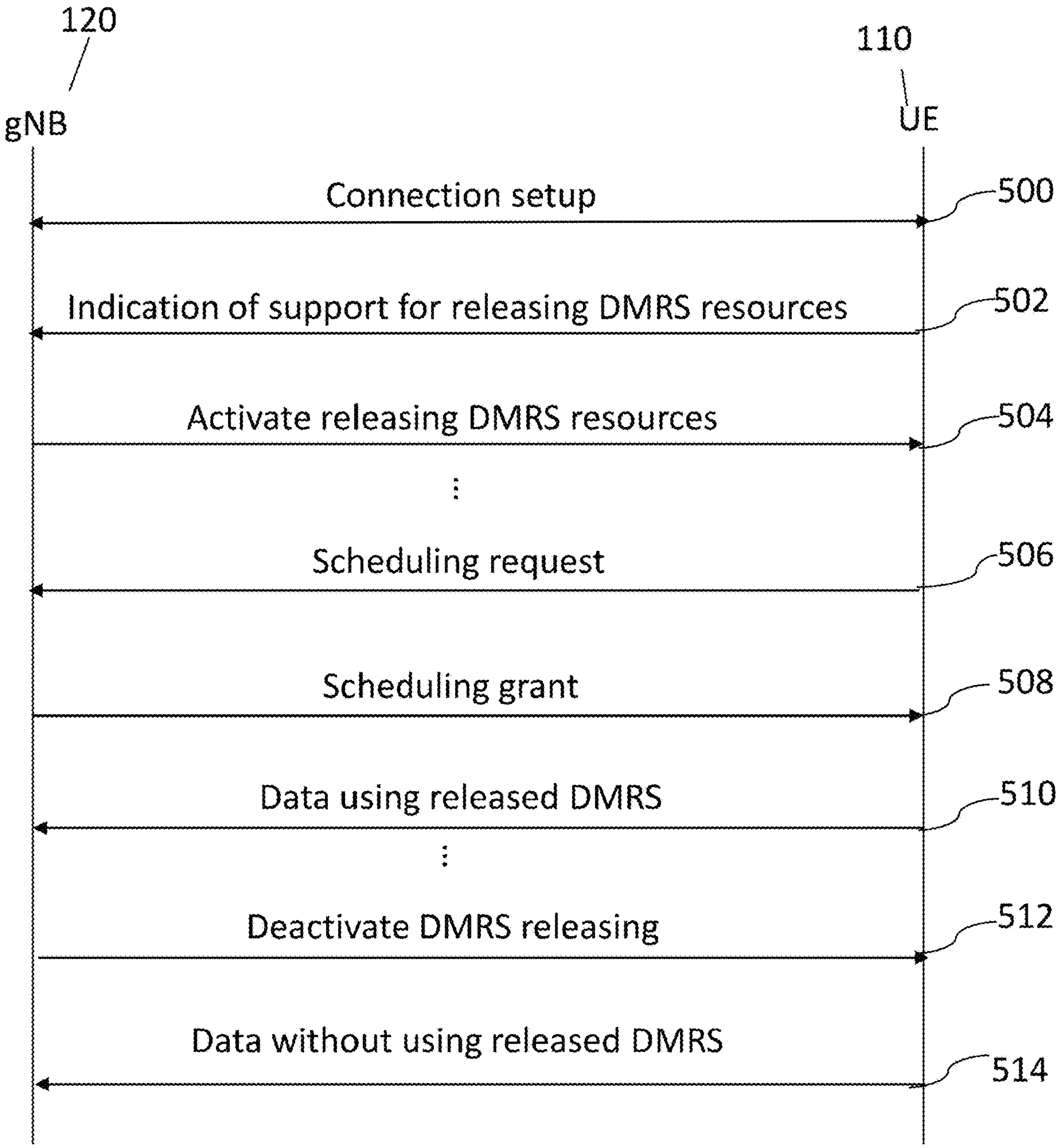
FIG. 5 shows an example signaling chart.

FIG. 5 shows an example signaling chart that can be used for examples of the disclosure.

At block 500 the UE 110 is connected to the gNB 120. At block 502 the UE sends an indication that the UE 110 can support releasing of DMRS resources to the gNB 120.

After receiving the indication that the UE 110 can support releasing of DMRS resources the gNB 120 can activate the releasing of the DMRS resources. The activation of the releasing of DMRS resources can comprise the gNB 120 sending a configuration to the UE 110 at block 504. The configuration can be signaled to the UE 110 using DCI or MAC CE or any other suitable signaling.

After the configuration for releasing the DMRS resources has been signaled to the UE 110 the UE 110 sends a scheduling request to the gNB 120 at block 506 and the gNB can respond to this, at block 508 by sending a scheduling grant. The scheduling procedure can be implemented using standard procedures. That is, the scheduling procedure can be the same if a reduced DMRS mode is being used or if a normal DMRS mode is being used. The scheduling request can be sent using a control channel such as a Physical Uplink Control Channel (PUCCH) and the scheduling grant can be sent using a control channel such as a PDCCH.

At block 510 the UE 110 transmits data. The transmitted data can use at least some of the released DMRS resources. The data can be transmitted using PUSCH. The proportion of DMRS resources that are released can be determined based on the resource allocation for the UE 110. The resource allocation can comprise the number of PRBs that are allocated to the UE 110. For instance, a DMRS mode can be selected based, at least in part, on the number of PRBs that are allocated to the UE 110. The proportion of DMRS resources that can be released is related to the number of PRBs that have been allocated so that a lower DMRS density can be used when a larger number of PRBs is used.

In some examples the gNB 120 can, at block 512, signal to the UE 110 that the releasing of DMRS resources is to be deactivated. The gNB 120 could send such a signal if it no longer has capabilities for releasing the DMRS resources. Such circumstances could arise if the gNB no longer has sufficient machine learning capacity available or if the machine learning program is no longer valid, or for any other suitable reason.

Following the reception of the deactivation signal the UE 110 can, at block 514, send data without using any released DMRS resources. A DMRS of normal density would be used. The data can be sent using PUSCH.

Other methods for deactivating the releasing of the DMRS resources could be used. For instance, in some examples the gNB 120 can signal a validity timer for the deactivation of the releasing of DMRS resources. The validity timer could define a number of transmissions for which the released DMRS resources can be used for data transmission. Once the validity timer has expired the UE 110 could switch to sending data without using any released DMRS resources. In this case a specific signal from the gNB 120 to deactivate the releasing of DMRS resources would not be needed.

Figure 6:
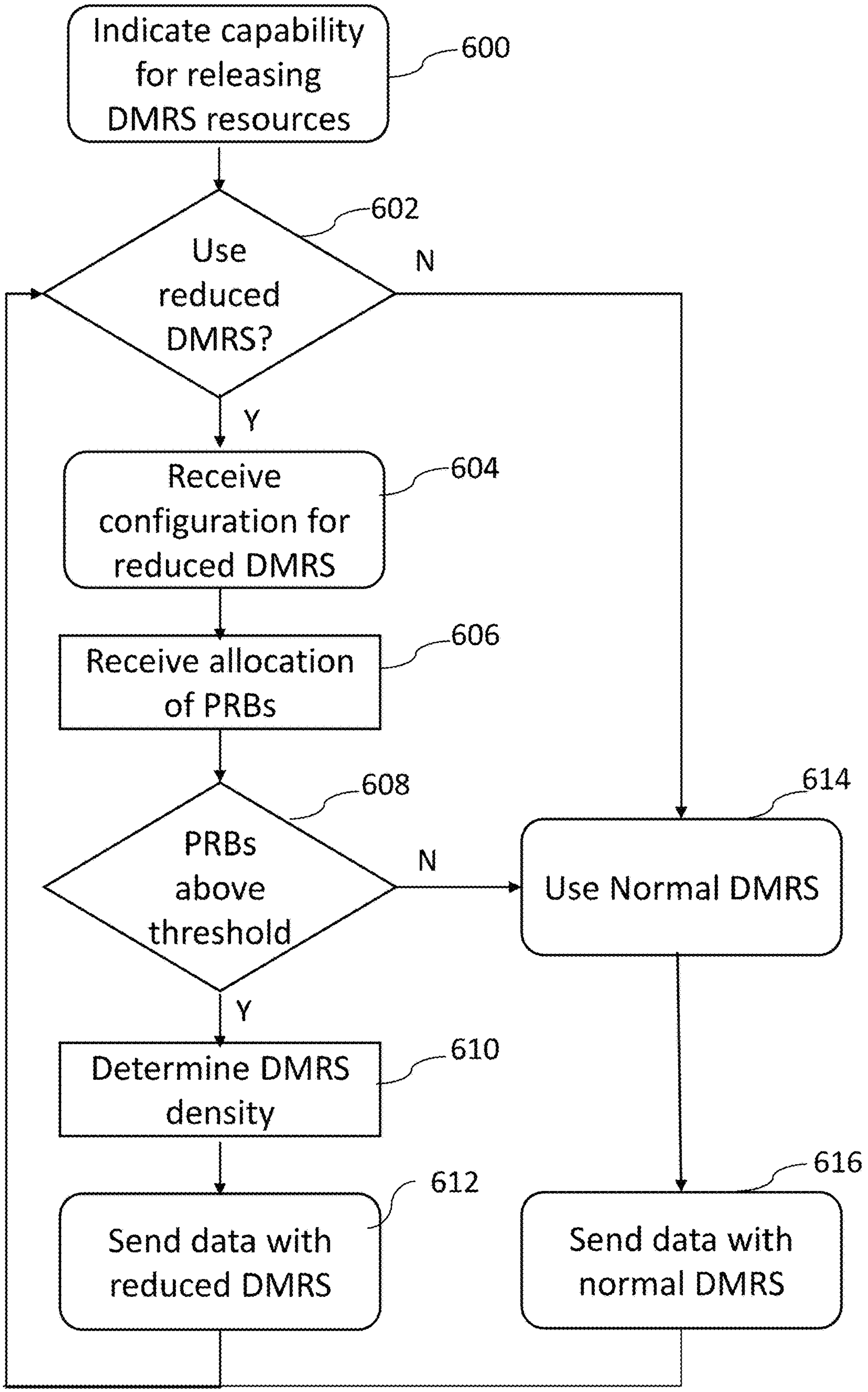
FIG. 6 shows another example method.

FIG. 6 shows another example method that can be implemented by a UE 110 or any other suitable terminal or device.

In this example the density of the DMRS can be controlled through the use of explicitly signalled threshold values.

At block 600 the UE 110 signals to the gNB 120 that it has capability for releasing DMRS resources and using a reduced DMRS mode. In some examples the UE 110 could request to the gNB 120 that reduced DMRS mode is used.

When the gNB 120 receives the indication that the UE 110 has capability for releasing DMRS resources and using a reduced DMRS the gNB 120 can determine whether a reduced DMRS mode is to be used. The gNB 120 can take any suitable factors into account when deciding whether a reduced DMRS mode is to be used. For example, the gNB 120 could take into account whether the gNB 120 has machine learning capabilities or any other suitable factor.

At block 602 it is determined whether a reduced DMRS mode is to be used. If a reduced DMRS mode is to be used then the method proceeds to block 604. If, at block 602, it is determined that reduced DMRS is not to be used then the method proceeds to block 614.

At block 604 the UE 110 receives a configuration from the gNB 120. The configuration can enable a reduced DMRS mode to be activated in the UE 110. The configuration can comprise the relevant information that the UE 110 needs to activate the reduced DMRS mode.

The relevant information that the UE 110 needs to activate the reduced DMRS mode can be provided to the UE 110 in any suitable format. The information can comprise a relationship between the density of the DMRS resources that are to be used and the resource allocation for the UE 110. In some examples the information can comprise threshold values for resource allocation and a corresponding DMRS density that is to be used. This could be provided as an LUT such as table 2 below. The values given in table 2 are for illustrative purposes and other values could be use in example implementations.

TABLE 2

| PRB allocation size received by UE | DMRS density to be used for UE TX |
|---|---|
| Smaller or equal to 4 | Full density |
| More than 4 but less than 8 | Half density |
| 8 or more | Quarter density |

Other methods of providing the UE 110 with the DMRS density could be used. For instance, the gNB 120 could signal values for parameters to the UE 110 where the values can be used as inputs to a function. The parameters could relate to resource allocation, channel dynamicity, or any other suitable factor or combination of factors. The function can be signaled to the UE 110 from the gNB 120 or could be stored in the memory of the UE 110 or stored in any other suitable location that is accessible for the UE 110. The UE 110 can then use the input parameters and the appropriate function to calculate the DMRS density that is to be used.

At block 606 the UE 110 receives a resource allocation from the gNB 120. The resource allocation can comprise a number of PRBs.

At block 608 it is determined whether the resource allocation satisfies the criteria for releasing DMRS resources. In this case it is determined whether the number of PRBs that are allocated is above or below a threshold.

If the resource allocation satisfies the criteria for releasing DMRS resources then the method proceeds to block 610. For example, if the number of PRBs is above a threshold then the method proceeds to block 610. In some cases, there can be multiple thresholds or ranges for PRBS and DMRS density. In such cases the resource allocation can be deemed to have satisfied the criteria for releasing DMRS resources if the number of PRBs are above the lowest threshold. For instance, in the case shown in table 2 the method would proceed to block 610 if more than four PRBs have been allocated.

At block 610 the UE 110 determines the density reduction that is to be applied to the DMRS. For example, an LUT such as table 2 can be used to determine the density reduction that is to be applied. Other methods for determining the density reduction, such as functions, could be used in some examples.

Once the density reduction has been determined the UE 110 maps the data for the released DMRS resources. The UE 110 can release DMRS symbols from the REs for transmission. The DMRS symbols can be released at equal intervals, such that the final number of DMRS symbols is larger or equal to the density reduction that has been determined.

The UE 110 can also determine the codeword length and encode the necessary amount of information bits to be modulated onto the REs. A standard procedure can be used for the encoding. That is, the encoding does not need to be changed to enable the use of the reduced DMRS mode.

After the data has been mapped to the released DMRS resources and encoded the UE 110 transmits the data with the reduced DMRS density at block 612.

After the data has been transmitted the process returns to block 602 and it is determined whether a reduced DMRS mode is to be used.

If, at block 602, it is determined that reduced DMRS is not to be used then the method proceeds to block 614. It might be determined that DMRS is not to be used because the gNB 120 might not have adequate machine learning capabilities, or for any other suitable factor.

At block 614 a normal DMRS mode is used. The normal DMRS mode uses a normal density of DMRS resources and does not release any of the DMRS resources for data transmission. The normal DMRS mode is used to map the data to the allocated resources. The data can then be transmitted, at block 616, using the normal DMRS mode.

Figure 7:
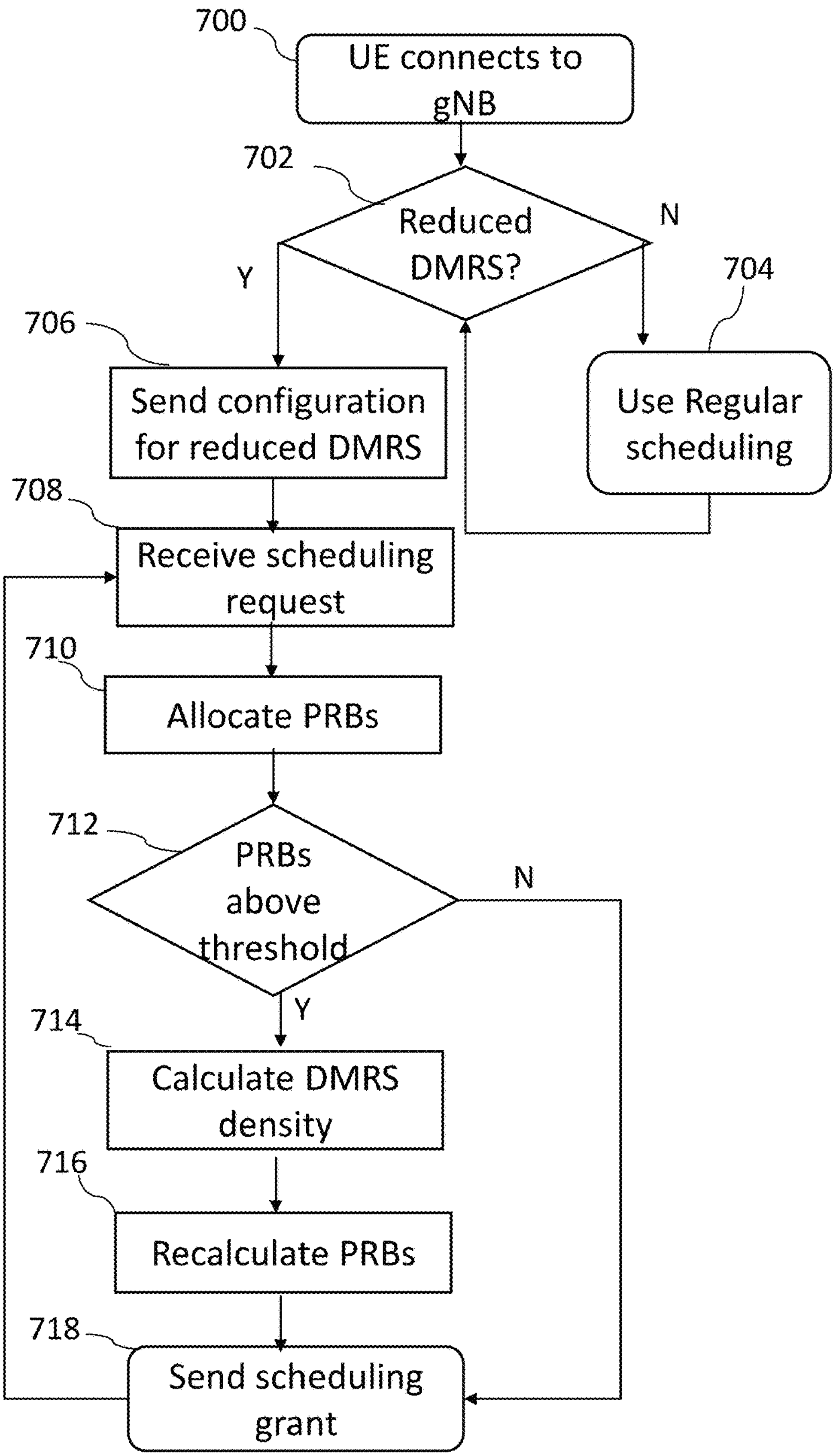
FIG. 7 shows another example method.

FIG. 7 shows another example method that can be implemented by a gNB 120 or any other suitable network entity. The method of FIG. 7 could correspond to the method of FIG. 6. That is, a gNB 120 performing the method shown in FIG. 7 could be in communication with a UE 110 performing the method of FIG. 6 or a method similar to the method of FIG. 6.

At block 700 the UE 110 connects to the gNB 120. At block 702 it is determined whether the gNB 120 has capabilities for a reduced DMRS mode. For instance, it can be determined whether the gNB 120 has sufficient machine learning capabilities or can otherwise satisfy a request for a reduced DMRS mode from the UE 110.

If, at block 702, it is determined that the gNB 120 does not have capabilities for a reduced DMRS mode then the method proceeds to block 704. At block 704 the gNB 120 uses regular scheduling using a normal DMRS mode and there is no releasing of DMRS resources. In this case there is no need for the gNB 120 to signal any configurations to the UE 110 because the normal DMRS mode can be used. The signalling requests and scheduling can proceed as normal without any modifications.

If, at block 702, it is determined that the gNB 120 does have capabilities for a reduced DMRS mode then the method proceeds to block 706. At block 706 the gNB sends a configuration for a reduced DMRS mode to the UE 110.

The configuration can indicate that a reduced DMRS mode is to be activated and/or any other relevant information.

At block 708 the gNB 120 receives a signalling request from the UE 110. The UE 110 can request resources for PUSCH data transmission. In response to the request the gNB 120 allocates, at block 712, resources to the UE 110. The gNB 120 can allocate a number of PRBs to the UE 110.

At block 710 it can be determined whether the whether the resource allocation satisfies the criteria for releasing DMRS resources. In this case it is determined whether the number of PRBs that are allocated is above or below a threshold.

If the resource allocation satisfies the criteria for releasing DMRS resources then the method proceeds to block 714. For example, if the number of PRBs that are to be scheduled is above a threshold then the method proceeds to block 714. In some cases, there can be multiple thresholds or ranges for PRBS and DMRS density. In such cases the resource allocation can be deemed to have satisfied the criteria for releasing DMRS resources if the number of PRBs are above the lowest threshold. For instance, in the case shown in table 2 the method would proceed to block 714 if more than four PRBs have been allocated.

At block 714 the gNB 120 calculates the density reduction that is to be applied to the DMRS. For example, an LUT such as table 2 can be used to determine the density reduction that is to be applied. At block 716 the gNB 120 can recalculate the number of PRBs in case fewer PRBs can suffice due to the reduced overhead. The recalculation of the PRBs can be important in scenarios where this a very wide bandwidth and more DMRS resources can be omitted.

After the number of PRBs has been recalculated the gNB 120 transmits the scheduling grant at block 718. The scheduling grant can be transmitted over DCI or using any other suitable signaling After the scheduling grant has been transmitted the method returns to block 708 so that another scheduling request can be processed.

Figure 8:
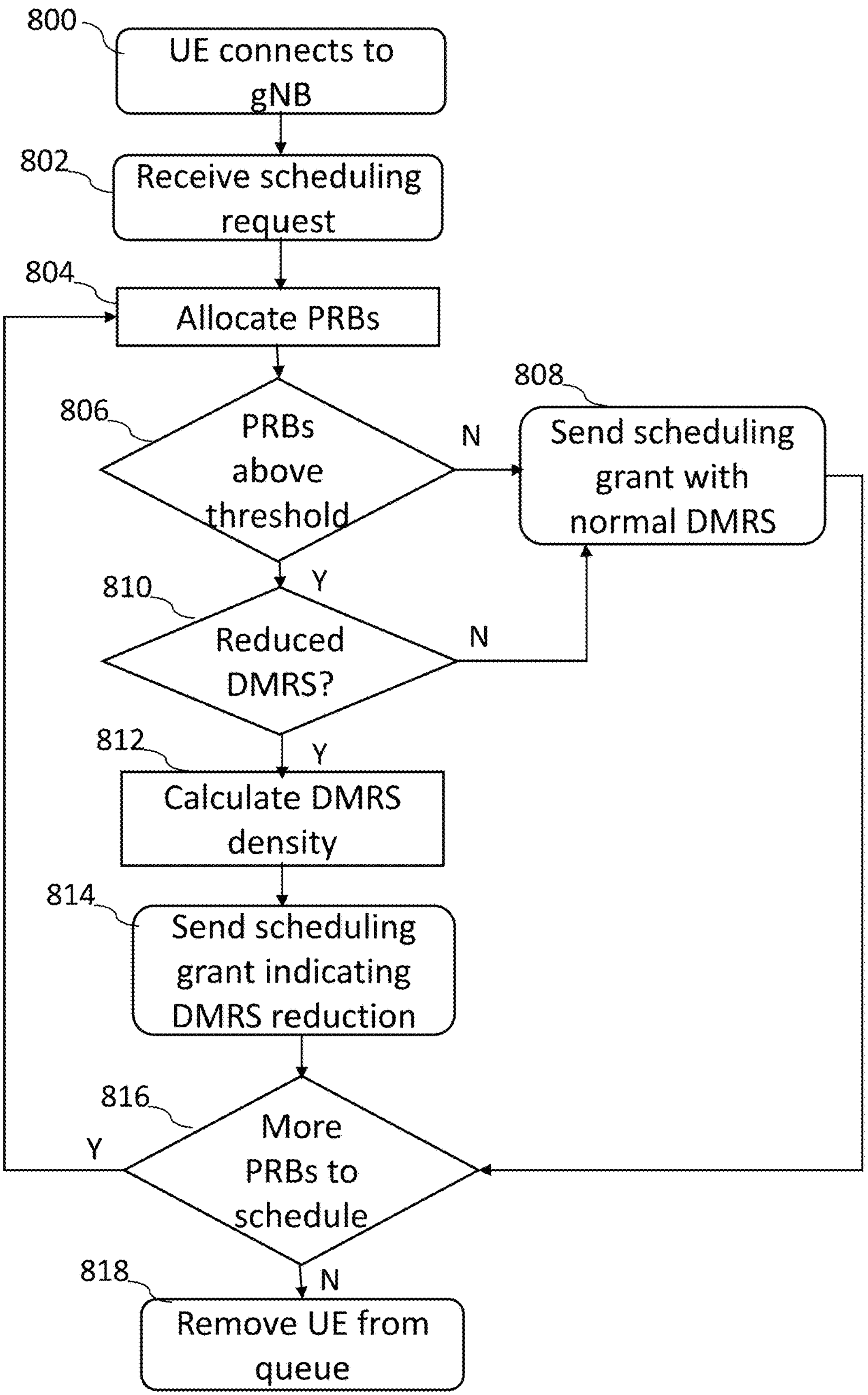
FIG. 8 shows another example method.

FIG. 8 shows another example method that can be implemented by a gNB 120 or any other suitable network entity. The method of FIG. 8 could correspond to the method of FIG. 6. That is, a gNB 120 performing the method shown in FIG. 8 could be in communication with a UE 110 performing the method of FIG. 6.

At block 800 the UE 110 connects to the gNB 120. At block 802 the gNB 120 receives a scheduling request or a buffer status report from the UE 110 and at block 804 the gNB 120 allocates PRBs to the UE 110.

At block 806 it can be determined whether the resource allocation satisfies the criteria for releasing DMRS resources. In this case it is determined whether the number of PRBs that are allocated is above or below a threshold.

If the resource allocation does not satisfy the criteria for releasing DMRS resources then the method proceeds to block 808. For example, if the number of PRBs that are to be scheduled is below a threshold then the method proceeds to block 808. In some cases, there can be multiple thresholds or ranges for PRBS and DMRS density. In such cases the resource allocation can be deemed not to have satisfied the criteria for releasing DMRS resources if the number of PRBs are below the lowest threshold. For instance, in the case shown in table 2 the method would proceed to block 808 if less than four PRBs have been allocated.

At block 808 the gNB 120 sends a scheduling grant using a normal DMRS mode and there is no releasing of DMRS resources. In this case there is no need for the gNB 120 to signal any configurations to the UE 110 because the normal DMRS mode can be used. The signalling requests and scheduling can proceed as normal without any modifications.

Alternatively, if the resource allocation satisfies the criteria for releasing DMRS resources then the method proceeds to block 810. At block 810 the gNB 120 can determine if the gNB 120 has capabilities for reduced DMRS modes. For instance, it can be determined whether the gNB 120 has sufficient machine learning capabilities to make use of sparser DMRS.

If, at block 810, it is determined that the gNB 120 does not have capabilities for a reduced DMRS mode then the method reverts to block 808 and the gNB 120 sends a scheduling grant using a normal DMRS mode.

If, at block 810, it is determined that the gNB 120 does have capabilities for a reduced DMRS mode then the method proceeds to block 812.

At block 812 the gNB 120 calculates the proportion of DMRS resources that can be released. Any suitable procedure such as an LUT or a function can be used to calculate the proportion of DMRS resources that can be released. The proportion of DMRS resources that can be released is related to the number of PRBs that have been allocated so that a lower DMRS density can be used when a larger number of PRBs is used. At block 812 the gNB 120 can also recalculate the number of PRBs in case fewer PRBs can suffice due to the reduced overhead. The recalculation of the PRBs can be important in scenarios where this a very wide bandwidth and more DMRS resources can be omitted.

At block 814 the gNB 120 transmits the scheduling grant. The scheduling grant can be transmitted using DCI or any other suitable signaling. The scheduling grant can include an indication of the proportion of DMRS resources that can be released. In this example the proportion of DMRS resources that can be released has been calculated by the gNB 120 and so can be signaled directly to the UE 110. This means that the UE 110 does not need to calculate the proportion of DMRS resources that can be released.

At block 816 it is determined if there are more PRBs to schedule. If there are more PRBs to schedule the method returns to block 804 and if there are no more PRBs to schedule then the UE 110 is removed from the scheduling queue.

Figure 9:
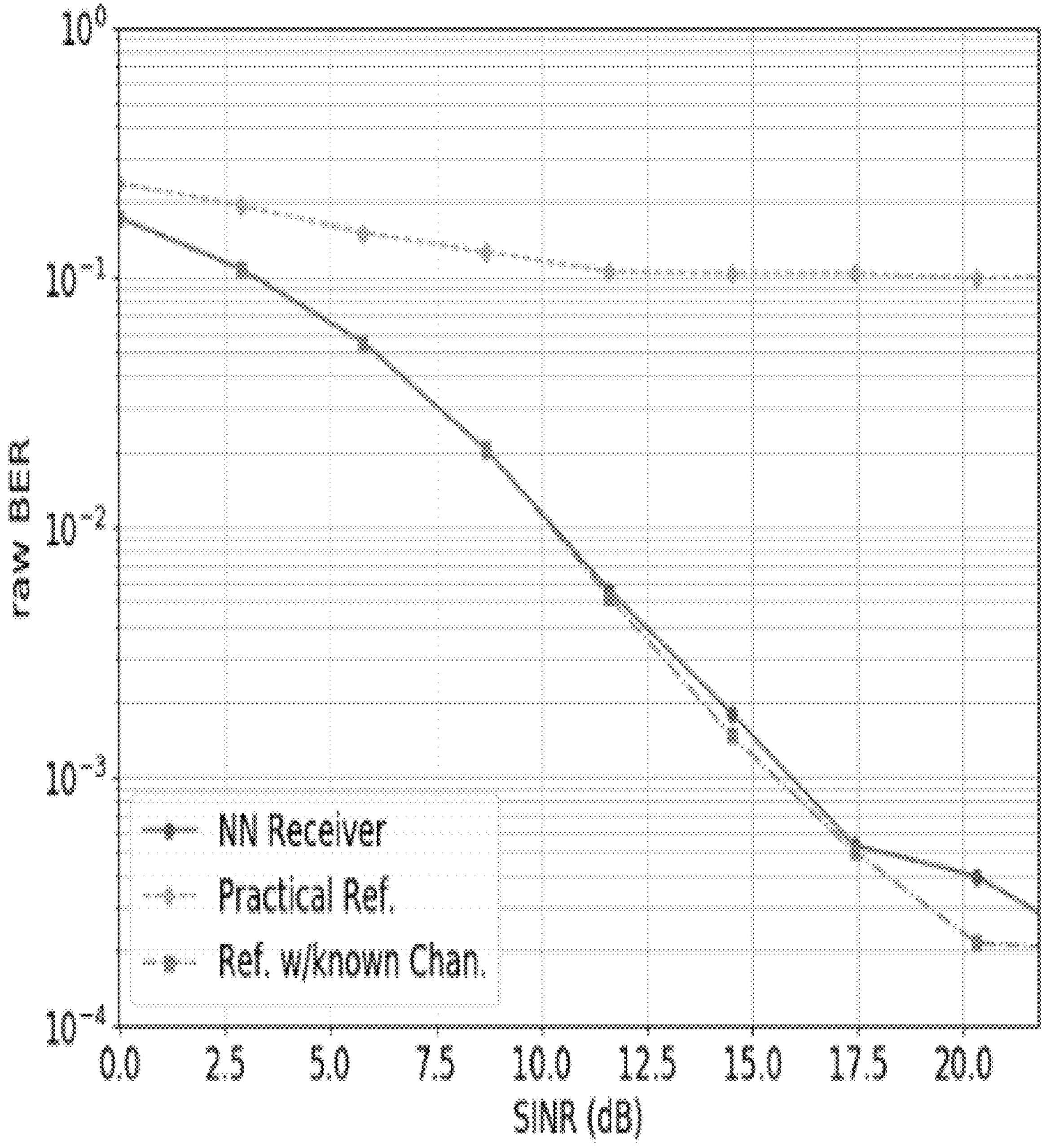
FIG. 9 shows example results.

FIG. 9 show a bit error rate (BER) for a receiver with machine learning capabilities. The data shown in the plot of FIG. 9 was obtained with 80% of the DMRS removed. This plot shows that the BER of the receiver with machine learning capabilities is largely unaffected by the removal of this amount of the DMRS. This therefore indicates that the receiver could make use of a reduced DMRS mode.

Figure 10:
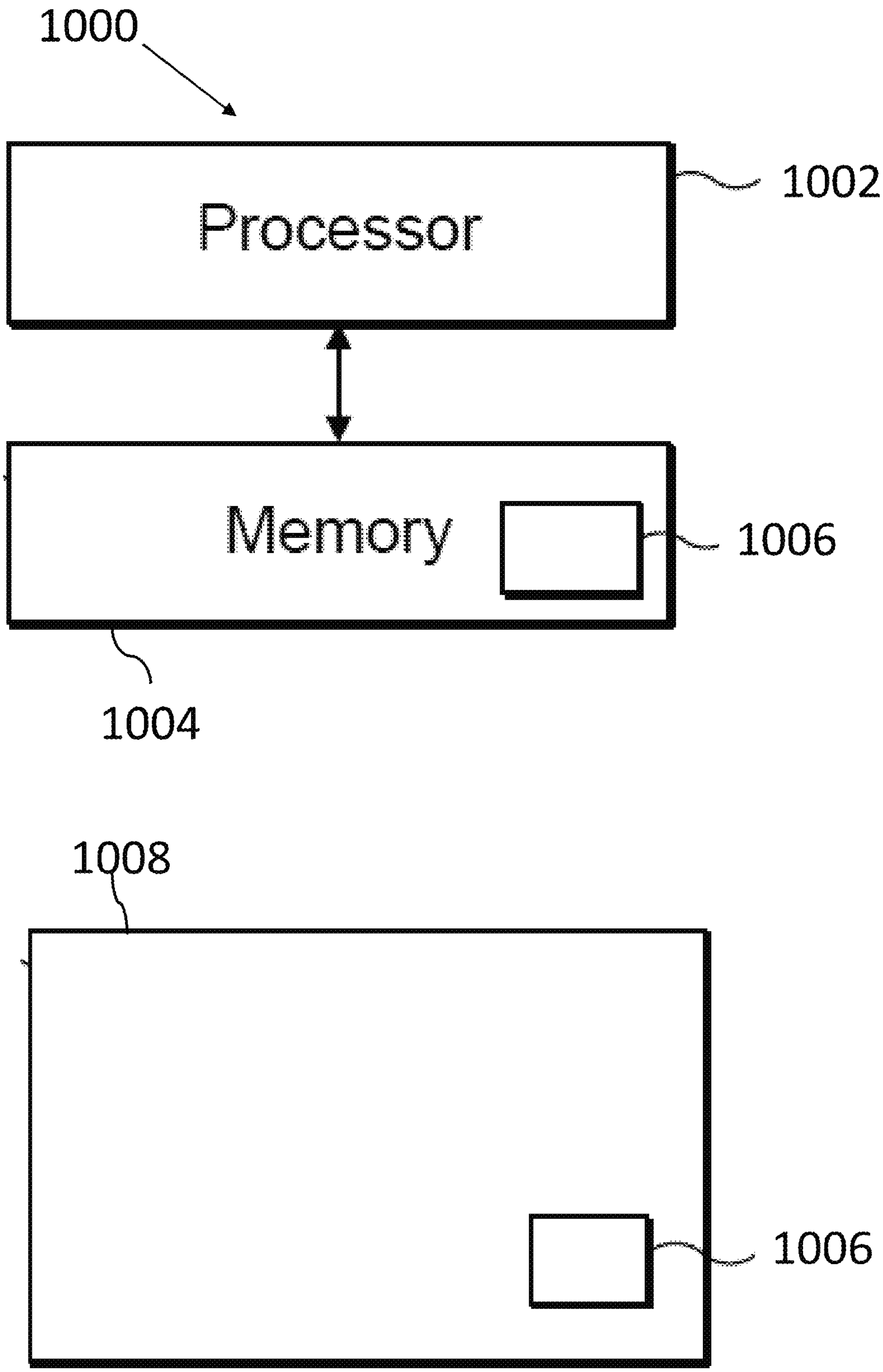
FIG. 10 shows an example controller.

FIG. 10 illustrates an example of a controller 1000. The controller 1000 could be provided within an apparatus such as a UE 110 or a node apparatus such as a gNB 120. Implementation of a controller 1000 may be as controller circuitry. The controller 1000 may be implemented in hardware alone, have certain aspects in software including firmware alone or can be a combination of hardware and software (including firmware).

As illustrated in FIG. 10 the controller 1000 can be implemented using instructions that enable hardware functionality, for example, by using executable instructions of a computer program 1006 in a general-purpose or special-purpose processor 1002 that may be stored on a computer readable storage medium (disk, memory etc.) to be executed by such a processor 1002.

The processor 1002 is configured to read from and write to the memory 1004. The processor 1002 may also comprise an output interface via which data and/or commands are output by the processor 1002 and an input interface via which data and/or commands are input to the processor 1002.

The memory 1004 stores a computer program 1006 comprising computer program instructions (computer program code) that controls the operation of the apparatus when loaded into the processor 1002. The computer program instructions, of the computer program 1006, provide the logic and routines that enables the apparatus to perform the methods illustrated in the FIGS. The processor 1002 by reading the memory 1004 is able to load and execute the computer program 1006.

In examples where the controller 1000 is provided within a UE 110 the controller 1000 therefore comprises: at least one processor 1002; and at least one memory 1004 storing instructions that, when executed by the at least one processor 1002, cause a UE 110 at least to perform:

receiving 400 a configuration for releasing demodulation reference signal resources for uplink transmission, wherein the releasing of the demodulation reference signal resources is contingent upon a resource allocation for the uplink transmission satisfying one or more criteria;

receiving 402 a resource allocation for the uplink transmission;

releasing 404 at least some of the demodulation reference signal resources if the resource allocation satisfies the one or more criteria and using at least some of the released demodulation reference signal resources as a data resource within the resource allocation; and transmitting 406 data using at least some of the released demodulation reference signal resources.

In examples where the controller 1000 is provided within a node apparatus such as a gNB 120 the controller 1000 therefore comprises: at least one processor 1002; and at least one memory 1004 storing instructions that, when executed by the at least one processor 1002, cause a gNB 120 at least to perform:

transmitting 410 a configuration for releasing demodulation reference signal resources for uplink transmission by a User Equipment 110, wherein the releasing of the demodulation reference signal resources is contingent upon a resource allocation for the uplink transmission satisfying one or more criteria;

transmitting 412 a resource allocation for the uplink transmission; and receiving 414 data wherein the received data uses at least some of the released demodulation reference signal resources.

The computer program 1006 may arrive at the UE 110 via any suitable delivery mechanism 1008. The delivery mechanism 1008 may be, for example, a machine-readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 1006. The delivery mechanism may be a signal configured to reliably transfer the computer program 1006. The apparatus may propagate or transmit the computer program 1006 as a computer data signal.

The computer program 1006 can comprise computer program instructions for causing a UE 110 to perform at least the following or for performing at least the following:

receiving 400 a configuration for releasing demodulation reference signal resources for uplink transmission, wherein the releasing of the demodulation reference signal resources is contingent upon a resource allocation for the uplink transmission satisfying one or more criteria;

receiving 402 a resource allocation for the uplink transmission;

releasing 404 at least some of the demodulation reference signal resources if the resource allocation satisfies the one or more criteria and using at least some of the released demodulation reference signal resources as a data resource within the resource allocation; and transmitting 406 data using at least some of the released demodulation reference signal resources.

The computer program 1006 can comprise computer program instructions for causing a node apparatus such as a gNB 120 to perform at least the following or for performing at least the following:

transmitting 410 a configuration for releasing demodulation reference signal resources for uplink transmission by a User Equipment 110, wherein the releasing of the demodulation reference signal resources is contingent upon a resource allocation for the uplink transmission satisfying one or more criteria;

transmitting 412 a resource allocation for the uplink transmission; and receiving 414 data wherein the received data uses at least some of the released demodulation reference signal resources.

The computer program instructions may be comprised in a computer program, a non-transitory computer readable medium, a computer program product, a machine-readable medium. In some but not necessarily all examples, the computer program instructions may be distributed over more than one computer program.

Although the memory 1004 is illustrated as a single component/circuitry it may be implemented as one or more separate components/circuitry some or all of which may be integrated/removable and/or may provide permanent/semi-permanent/dynamic/cached storage.

Although the processor 1002 is illustrated as a single component/circuitry it may be implemented as one or more separate components/circuitry some or all of which may be integrated/removable. The processor 1002 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The stages illustrated in FIGS. 2 to 5 can represent steps in a method and/or sections of code in the computer program 1006. The illustration of a particular order to the blocks does not necessarily imply that there is a required or preferred order for the blocks and the order and arrangement of the block may be varied. Furthermore, it can be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. A User Equipment comprising at least one processor, and at least one memory storing instructions that, when executed by the at least one processor, cause the user equipment at least to:

receive, in a control channel comprising a Physical Downlink Control Channel, a configuration for releasing demodulation reference signal resources for uplink transmission, wherein the releasing of the demodulation reference signal resources is contingent upon a resource allocation for the uplink transmission satisfying one or more criteria, wherein the one or more criteria comprise a number of Physical Resource Blocks allocated to the User Equipment for the uplink transmission satisfying one or more threshold values, wherein the received configuration comprises:

an indication of a proportion of the demodulation reference signal resources that are releasable, and information indicating a validity timer for the releasing of the demodulation reference signal resources, wherein the indication comprises one or more parameters representing a relationship between allocated resources and the proportion of demodulation reference signal resources that are releasable, and wherein the proportion of demodulation reference signal resources that are releasable is determined based, at least in part, on one or more service requirements, the one or more service requirements comprising a high data throughput requirement for at least one of augmented reality, virtual reality, or extended reality;

access a look up table to determine:

a reduction level for the demodulation reference signal, and time and frequency positions of the demodulation reference signal, wherein the look up table indicates that full demodulation reference signal density is used when the Physical Resource Block allocation size is smaller than or equal to four, half demodulation reference signal density is used when the Physical Resource Block allocation size is more than four but less than eight, and quarter demodulation reference signal density is used when the Physical Resource Block allocation size is eight or more;

inform a network entity that the User Equipment supports releasing the demodulation reference signal resources for the uplink transmission;

request releasing of the demodulation reference signal resources for the uplink transmission;

receive a resource allocation for the uplink transmission, the resource allocation comprising an indication of the number of Physical Resource Blocks allocated to the User Equipment;

release at least some of the demodulation reference signal resources in response to determining that the resource allocation satisfies the one or more criteria and using at least some of the released demodulation reference signal resources as a data resource within the resource allocation, wherein releasing the at least some of the demodulation reference signal resources comprises releasing demodulation reference signal symbols from resource elements at equal intervals such that a final number of demodulation reference signal symbols is larger than or equal to the determined reduction level; and transmit data, on a Physical Uplink Shared Channel, using at least some of the released demodulation reference signal resources.

* * * * *